July 16, 1963 M. P. AMASON Re. 25,417

LIGHTNING ARRESTOR FOR RADOMES

Original Filed June 11, 1959

INVENTOR.
MYRON P. AMASON
BY
Edwin Coates
ATTORNEY

United States Patent Office

Re. 25,417
Reissued July 16, 1963

25,417

LIGHTNING ARRESTOR FOR RADOMES

Myron P. Amason, Reseda, Calif., assignor to Douglas Aircraft Company, Inc., Santa Monica, Calif.

Original No. 2,982,494, dated May 2, 1961, Ser. No. 819,764, June 11, 1959. Application for reissue May 22, 1962, Ser. No. 197,200
6 Claims. (Cl. 244—1)

Matter enclosed in heavy brackets [ ] appears in the original patent but forms no part of this reissue specification; matter printed in italics indicates the additions made by reissue.

This invention relates to lightning protection systems and more particularly to a lightning protection system for use on general purpose radomes or plastic sections on airplanes.

Approximately 37% of the lightning strikes on an airplane while in flight are on the nose section. Generally mounted in the nose section of an airplane is the radar and other directional equipment. To protect this equipment from damage it is generally enclosed within a molded plastic enclosure called a radome. The preferred material for the construction of a radome consists of laminations of a glass fiber and resin combination. The use of laminations of glass fiber and resin has been found desirable because of their high strength properties and their relatively low interference with the electrical operation of the enclosed equipment.

When a [lighting] *lightning* stroke step leader nears an aircraft, an intense electric field is set up and streamers produced by this field leave the aircraft from high gradient points to meet the step leader. High gradient points in the nose region occur along the edges of the radar antenna and mounting structure. Streamers may initiate from these edges inside the radome, puncture the radome at several places, and connect with the main stroke. While the streamers produce only pinholes, the main stroke to which they connect may pass down the streamer and through the radome, and cause extensive damage.

Since the radome's dielectric strength is not great enough to withstand puncture, and if puncture occurs, the radome may be seriously damaged, it is necessary to provide the radome with a protective system.

A wide variety of lightning protection problems are presented by the different types of radomes and radars in use. Radars utilize many different modes of transmission, frequencies and types of antennas. Radomes have many different types of wall construction, shapes, sizes and external coatings. These make the development of a universal protection system for all radomes difficult. For this reason, the radome protection problem should be approached according to the type of radome such as, Type I—General purpose microwave, Type II—Directional guidance, Type III—Broad-band, Type IV—Low reflection and Type V—Low frequency. This invention is concerned generally with lightning protection for type I, general purpose radomes used with search and weather type radars which have no severe requirements on directional accuracy or low reflections.

Lightning protection systems, which have been developed for aircraft plastic sections, in general may be classified as stroke guiding systems, exposed grounded metal buttons, stroke diverting rods, graded resistance, and external conductors. The stroke guiding system is used on canopy type enclosures. It utilizes the dielectric strength of materials such as the acrylics to withstand puncture for a brief interval until an external surface flashover occurs to lower the potential across the dielectric. The physical and electrical characteristics of the acrylics prevent their use in radome construction. Also, since the basic radome construction has a relatively low dielectric strength this method will not work. Exposed grounded metal buttons, although successful where the ground lead is not installed parallel to the inside surface of low dielectric materials, are not practical for this application since the moving antenna would interfere with a non-parallel lead. Although the stroke diverting rod system has proven to be very successful on other extremities of the aircraft such as wing and tail tips, it is not applicable to the nose of the aircraft. Graded resistance systems at present require further development in the fields of increased resistance to rain erosion and radar transmission loss. The external conductor system is made up of a network of external conductors which form a shielding cage over the nose area and reduce the tendency for streamer formation from points inside the radome. The cage also provides points from which external streamers may initiate as well as intercepting any main strokes in the vicinity of the radome. Thus, the external conductor type of lightning protection system proves to be the most advantageous for use on the radome since it obviates the difficulties encountered in the above mentioned systems.

The external conductor type of electricity discharge system is old in the art. It has been used for many years to dissipate the electrostatic or precipitation static electrical charges accumulated from rain, mist, and snow on the aircraft external surface or the electrostatic charge developed by the friction of the air on the surfaces of the airplane. These charges interfere with the operation of the radio apparatus, ignite combustible gas escaping from the motor feed system or potentially could set the airplane on fire.

One such electrostatic discharge system uses long lead wires extending in parallelism along the axis of the airplane in contact with the external surface. There are short collecting terminals branching off from the lead wires and disposed parallel to each other. Another system uses spaced longitudinally arranged conducting layers secured to the exterior of a plastic loop antenna shell. These layers are aligned parallel to the aerodynamic currents around the shell when in flight. Substantially the entire surface of the shell is covered with the conducting layers providing only enough open regions to minimize eddy current losses resulting from the covering of the enclosure. By arranging the layers in a streamline configuration the wind currents which pass about the shell during flight always exert a pressure on the layers in a manner assisting to press them firmly in their position on the shell, rather than in any other direction to dislodge them. Because of this aerodynamic assist, the layers are simply pasted on the surface, without great concern as to the permanency of the binding action of the adhesive. A further method employs two sets of parallel conductors which are set in grooves in the surface to substantially enclose the conductors. Each conductor is open at one end with its other end connected to ground, providing a Faraday method of shielding that permits the electromagnetic waves of a radio direction finder to penetrate therethrough but substantially stopping electrostatic penetration. The strips are pasted or directly plated on the surface and are electrically connected by an interconnecting strip which extends across all the longitudinal strips for connecting the layers to ground potential.

From the above mentioned systems, it is noted that external conductors on the surface of an aircraft have been used exclusively to dissipate electrostatic charges. These conductors have been arranged to substantially cover the surface, and their configurations have been designed to provide a continuous path to ground from any point on the system; thereby connecting large groups or all of the conductor path to one ground potential connector. The system configurations generally follow and conform to the motion of the aerodynamic air currents which flow over the aircraft surfaces. These systems either mount the conductors above the surface, loosely bond the conductor to the surface, plate the conductor on the surface, or imbed the conductor in grooves in the surface.

As will be discussed more fully in subsequent paragraphs a lightning arresting system which substantially covers a general purpose radome interferes so radically with radar transmission that the utility of the radar is completely destroyed. Therefore, a system must be used that provides the maximum protection to the radome for the least electrical interference with the radar transmission. Further to provide this condition, each individual segment of the system must be independently grounded, so that a strike to the system will not destroy the whole system or a major portion of it. By grounding each segment of the system individually, a charge of lightning is conducted directly to a conductor of relatively larger size and there it is dissipated without damaging other portions of the system. To reduce the aerodynamic drag the layers must be small, and cannot be mounted above the surface. Yet they cannot be imbedded within the surface. It has been found impractical to imbed large conductor bars in radome surfaces because of the necessity to contour the surface. While small conductors could be imbedded, the damage caused to the surrounding radome area when they are contacted by the main stroke of lightning makes such an installation impractical. As discussed above, large conductors cannot be mounted above the surface, nor can large or small conductors be imbedded in the surface. The system must be made from flat, small conductors which are mounted directly on the radome surface. These conductors must be mounted in such a fashion as to withstand aerodynamic forces, yet must be able to be readily disassociated from the surface when contacted by the main stroke of lightning so that the adjacent radome surface will not become damaged.

The necessity for protecting Fiberglas housings depends upon the necessity of protecting the enclosed equipment. In many cases the equipment may require little electrical protection as it may be essentially grounded to the aircraft skin with adequate conductor sizes as, for example, radar antennas. Therefore, as discussed previously, the primary reason for the installation of a lightning arrestor on a laminated Fiberglas radome is not for protection of the equipment contained within but for the protection of the radome itself. While external conductor systems have been used before for protection, their use has been limited to a protection system which is not compatible with the requirements of a jet aircraft. The present invention resides in the use of a novel type of external conductor arranged in a novel configuration to achieve a novel and unexpected result.

The external conductor system for lightning protection for a general purpose radome has been used before. This system incorporates the use of a conducting bar attached to the surface to be protected. It has been found through experimentation and extensive field use that external conductors having a cross section of 20,000 circular mils were the minimum size conductor that would not be seriously damaged when intercepted by the main stroke of lightning. As mentioned above, a conductor of this size would not be compatible for use on a general purpose radome of the type used on jet airplanes in that, if it were installed on the external surface of the radome, it would cause excessive aerodynamic drag. On the other hand, if a large conductor were installed flush with the outside skin of the radome it would introduce major complications to the radome design. Because of the foregoing, it was necessary to conceive and develop a system using the minimum size conductor that would protect the radome from [dammage] *damage* if the aircraft intercepted a main stroke in the vicinity of the radome.

Previously, a conductor of 20,000 circular mils was considered by persons skilled in this art to be the minimum size conductor that would give the desired protection and yet not be seriously damaged when intercepted by the main stroke of lightning. However, it has been found that, by the use of the present invention, a novel configuration and use of a conventional basic material has produced a novel and completely unexpected result.

In its presently preferred form the invention consists of a network of external conductor paths which form a shield cage over the radome surface. The conductor paths are metal foil strips adhesively placed on the radome surface according to a specific design to provide the maximum protection to the radome for the least electrical interference with the equipment contained within the radome. Each strip is complete within itself because it is individually grounded at one end to the airplane fuselage.

Other advantages of the invention will hereinafter become more fully apparent from the following description of the annexed drawing, which illustrates a preferred embodiment, and wherein.

Figure 1:
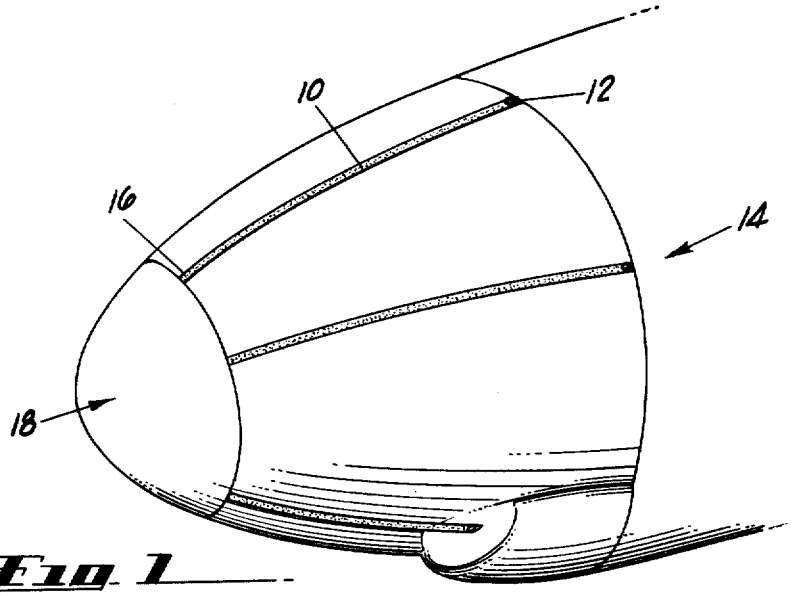
FIG. 1 is a fragmentary perspective view of an aircraft type radome and a portion of an airplane fuselage illustrating a typical installation of this invention.
Figure 2:
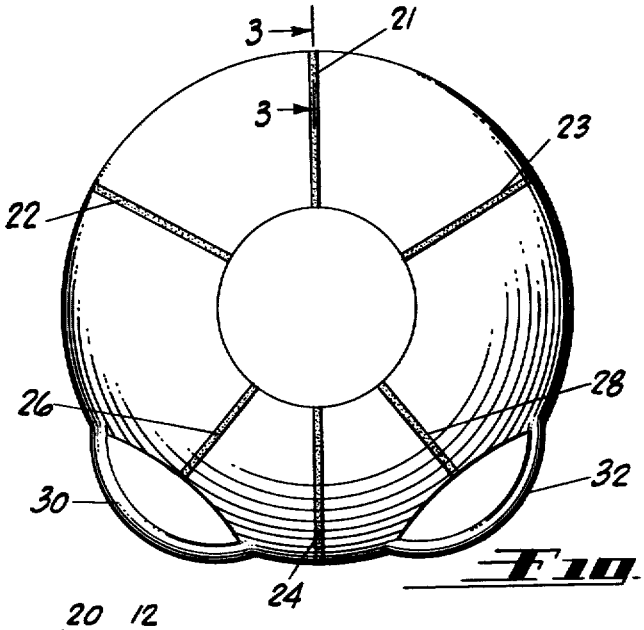
FIG. 2 is a front elevational view of an aircraft type radome illustrating a typical installation of this invention.

Referring now to FIGS. 1 and 2, the lightning protection system includes a plurality of conductor paths 10 which are arranged in a cage configuration to give the maximum lightning protection with the least hindrance to the antenna system contained within the radome. The conductor paths 10 are metal foil strips, adhesively bonded on the surface of the radome either by pressing directly onto the surface suitable metallic tape with a high temperature resistive, pressure sensitive backing or by first placing a high temperature resistive, pressure sensitive adhesive on the surface and pressing the foil strips into the adhesive. Either method produces the desired mounting of the foil strips, but it has been found more desirable to use the adhesive backed metallic tape. For each of installation, the tape need only be pressed onto the surface of the desired location, thereby eliminating the difficulties of first applying the adhesive to the surface and then pressing on the foil strips.

In the presently preferred embodiment of the invention an aluminum alloy tape, approximately ⅜ of an inch wide, is used. This tape has a high temperature resistive, pressure sensitive adhesive backing and has a thickness of approximately .003 of an inch. It is commercially known as "Scotch 425." The invention is not specifically limited to foil strips ⅜ of an inch wide. It would still be within the scope of the invention to use foil strips that varied from ⅛ inch to several inches in with. However, for ease of application, and least radar obscuration a foil strip ⅜ of an inch wide has proven to be the most effective.

As described above, in the presently preferred embodiment of the invention an aluminum alloy tape is utilized as the conductor path. It is to be understood that the invention is not specifically limited thereto, any metallic tape or metal foil strip of like size and dimension can be utilized as well.

The conductor paths 10 are arranged on the surface in a fore and aft direction so that no point on the radome surface is farther distant than 18 inches from the nearest conductor path 10 or the metallic airplane fuselage 14. From the standpoint of efficient operation of the radar it is desirable that no more than fifty percent of the radome surface be covered with the conductor paths. Said paths 10 extend forward of the radome base 12 to a point 16 just aft of the radome rain erosion boot 18.

Figure 3:
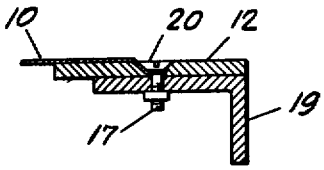
FIG. 3 is a portion of the cross sectional view taken at 3—3 in FIG. 2 showing the grounding connection of the conductor paths.

Referring now to FIG. 3, to provide a means of grounding each conductor path 10 near the base of the radome 12 they are connected under the head 20 of an adjacent radome attaching flange bolt 17. The radome attaching flange 19 makes contact through the mounting hinge and radome latches (not shown) with the airplane fuselage, thus providing a ground path for the lightning arrestor system. Since each conductor path 10 is individually grounded, the main stroke of lightning intercepting one of these paths will be conducted to ground by that path and in no way will it affect any other portion of the system.

Since the exact configuration of the conductor path cage will depend upon the contour of the specific radome to which it is applied, and the nature of the antennas carried within the radome, for sake of clarity in this description a typical installation will be described.

Referring to FIG. 2, revolving within the radome is a radar antenna, and in some instances located beneath the radar antenna is the glide [scope] *slope* antenna. For the best results it has been found that three glide [scope] *slope antenna* protective conductor paths 24, 26, 28, should be placed on the lower portion of the radome surface. To minimize the distortion of the glide [scope] *slope* antenna pattern conductor paths 26, 28 are placed fore and aft of the radome along the axis of symmetry of each of the dual air scoops 30, 32 respectively. The third conductor path 24 is mounted centrally between paths 26, 28, thus forming a cage configuration so that all points on the radome surface adjacent the glide [scope] *slope* antenna are less than 18 inches from the nearest conductor path or the airplane fuselage.

To protect the surface of the radome above the radar antenna three radar protective conductor paths 21, 22, 23 are placed on the upper radome surface. To produce minimum obscuration of the radar transmission a conductor path 21 is mounted fore and aft of the upper surface of the radome along the vertical plane of symmetry of the radome. Conductor paths 22, 23 are mounted radially adjacent path 21 and are arranged to produce a configuration so that no point between said paths is farther distant than 18 inches from the nearest path or the airplane fuselage.

To provide a protective system which provides during operation of the system the least destruction or consumption of its components each glide [scope] *slope antenna* protective conductor path and each radar protective conductor path respectively is grounded at its aft point on the radome surface to an adjacent radome attaching flange bolt 17. The radome attaching flange makes contact through the mounting hinge and radome latches with the airplane fuselage. This individual grounding of each path to the radome attaching flange provides for each strip a relatively large conductor path through which the lightning charge is dissipated, thereby preventing the lightning charge from damaging other segments of the system.

After installation of the conductor paths the surface of the radome is covered with a catalyzed epoxy paint, or a paint of a similar type. This protective coating of paint is applied chiefly as a means of protecting the radome surface from rain erosion.

When the main stroke of the lightning strikes a portion of the conductor path, the conductor path at the point of contact and a portion of the path between the point of contact and the fuselage is disintegrated much like an overloaded fuse. This disintegration causes no damage to the radome surface and simply necessitates an installation of a new section of conductor. Since each conductor path is connected separately to ground with no interconnection between the individual conductor paths, only that conductor which has been contacted by the lightning will be destroyed. This means that only that conductor will have to be placed since the others have not been affected.

The disintegration property of this lightning arrestor system is considered by experts in the lightning arrestor field to be a novel and completely unexpected result. As discussed above, bars of 20,000 circular [mills] *mils* and larger have been mounted on the surface of a radome to provide lightning protection. Because of the size of these bars and the excessive aerodynamic drag developed by them at high speeds they have proven incompatible with the needs of a high speed jet aircraft. The above mentioned bars are the minimum size that will not disintegrate upon contact with the main stroke of lightning. Therefore, as the conductor size is reduced there is the problem of distintegration to consider. To use this property of disintegration to advantage in the above described presently preferred embodiment of the lightning arrestor system the adhesive backed metallic tape is adhesively secured to the radome with a light bond and then is covered with a thin coating of catalyzed epoxy paint. The bonding of the tape to the radome surface and the thin coating of paint prevent excessive aerodynamic drag developed by the tape, but is such that when the tape is contacted by the main stroke of lightning the tape along the point of contact will be exploded from in contact with the radome, providing an ionized trail of metallic ions. It is this ionization trail that conducts the subsequent long discharge of the main stroke of lightning over the radome surface.

The explosion of the tape ionizes the metallic portion thereof but does not appreciably disturb the adhesive bonding material. The explosive ionization of the metallic portion of the tape dissipates a portion of the energy of the lightning charge through the development of the heat necessary to produce the ionization. After the explosive ionization, the adhesive bonding material remains in contact with the radome surface and provides an additional protective coating of insulation against the long discharge of the lightning. Had the tape been embedded in the radome surface or permanently bonded thereto, the tape would not have been able to explode from in contact with the surface and the contact of the main stroke of lightning would have caused excessive damage to the radome area surrounding the tape at the point of contact. For this reason a weaker, but yet effective bond is provided which enables the tape to pull loose from the radome surface under the explosive action of the lightning strike but permits the adhesive bonding material to remain in contact with the surface and provide the insulation blanket.

To provide an adhesive bonding agent that displays the necessary resistance to the explosive-heat reaction resulting from the explosion of the metallic portion of the tape a pressure sensitive adhesive of the high temperature resistive type is utilized as the bonding agent. As described above, there are available commercially, adhesive backed metallic tapes which contain adhesive backing of the desired type to produce this novel, unique lightning arresting system.

The preceding description has been limited to use of the invention to protect aircraft radomes. It is desired to point out, however, that the invention should not be limited to this application, since it has applicability as a protection system for all types of vehicles that move through the air as well as all kinds of housings and enclosures.

Although the now preferred embodiment and methods of the present invention have been illustrated and described it is to be understood that the invention need not be limited thereto for it is susceptible to change in form, detail and application, within the scope of the appended claims.

I claim:

1. In combination with a plastic [aircraft] section *of an aircraft fuselage,* a lightning arrestor, comprising: at least one conductor path of lightning ionizable material adhesively fastened to the plastic aircraft section exterior providing maximum lightning protection for the minimum electrical interference; each path being adapted to have a portion thereof completely transmuted by a lightning strike thereto into an ion trail outwardly disposed from said plastic section to conduct away from said section the energy of said lightning strike; at least one grounding means adapted to ground said conductor paths individually to the aircraft fuselage.

2. In combination with a plastic [aircraft] section *of a metallic aircraft,* a lightning arrestor comprising: a plurality of conductor paths adhesively attached to the external surface of the section in a fore and aft direction and at intervals with no point on said section further distant than eighteen inches from an adjacent conductor path or a metallic part of the *aircraft* [airplane fuselage], said paths covering no more than fifty percent of the surface area of said section, each path being adapted to have a portion thereof completely transmuted by a lightning strike thereto into an ion trail outwardly disposed from said section to conduct away from said section the energy of said lightning strike; and means connected to each of said conductor paths for grounding each strip individually to the aircraft [fuselage].

3. In combination with a plastic [aircraft] section *of a metallic aircraft fuselage,* such as a radome section, a lightning arrestor comprising: a plurality of strips of adhesive backed metallic tape placed on the external surface of the section in a fore and aft direction and at intervals with no point of said section further distant than eighteen inches from an adjacent strip of said tape or metallic part of the [airplane] fuselage, said strips covering no more than fifty percent of the radome surface, each strip being adapted to have a portion thereof completely transmuted by a lightning strike thereto into an ion trail outwardly disposed from the external surface of said section to conduct away therefrom the energy of said lightning strike; and, means connected to each of said strips of tape for grounding each strip individually to the aircraft fuselage.

4. In combination with a plastic [aircraft] section *of a metallic aircraft,* a lightning arrestor comprising: a plurality of strips of adhesive material having a high heat resistance laterally spaced from each other and longitudinally arranged on the surface of said section; and a strip of lightning ionizable material mounted on each of said strips of adhesive material and adapted to be completely explodably disassociated therefrom by a lightning strike to form an ion trail outwardly disposed from the surface of said section for conducting away from said section the energy of said lightning strike; each of said strips of ionizable material being individually grounded to a metallic portion of the aircraft.

5. A lightning arrestor in combination with a plastic [aircraft] radome *of an aircraft* [enclosing], *said radome being adapted to enclose* a plurality of metallic members, comprising: a plurality of strips of adhesive backed metallic tape placed on the external surface of said radome [adjacent to the edge surfaces of said metallic members] in a fore and aft direction thereby defining a cage, said cage covering no more than fifty percent of the radome surface, each strip being adapted to have a portion thereof completely transmuted by a lightning strike thereto into an ion trail outwardly disposed from said radome; and means connected to each of said strips to ground each strip individually to the aircraft [fuselage]; whereby said cage prevents high field concentration from forming on said metallic members when said aircraft flies between oppositely charged cloud masses so that a lightning stroke nearing the radome surface will ionize a portion of one of said strips into an ion trail for conducting away from the radome the energy of said lightning strike.

6. In combination with a plastic [aircraft] section *of an aircraft,* a lightning arrestor, comprising: ionizable means associated with the exterior surface of said section and adapted to have a portion of said ionizable means completely transmuted by a lightning strike thereto into an ion trail adjacent to the exterior surface of said section to conduct away therefrom the energy of said lightning strike; and means associated with said ionizable means for grounding it to the aircraft [fuselage].

References Cited in the file of this patent or the original patent

UNITED STATES PATENTS

| | | |
|---|---|---|
| 367,435 | O'Brien | Aug. 2, 1887 |
| 443,048 | Hodges | Dec. 16, 1890 |
| 796,760 | Price | Aug. 8, 1905 |
| 1,419,261 | Howard | June 13, 1922 |